May 10, 1966  E. J. WELLER ETAL  3,249,985
CUTTING TOOL
Filed Oct. 11, 1965
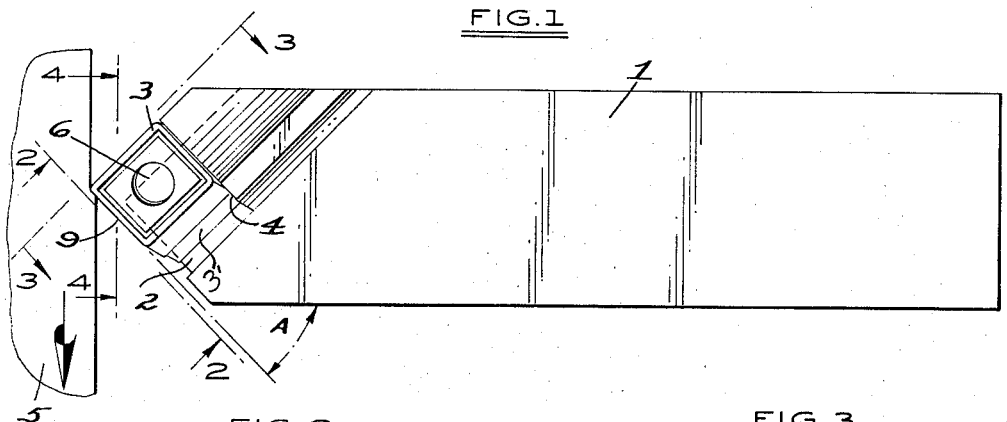
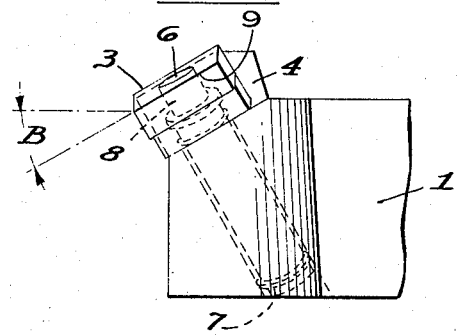
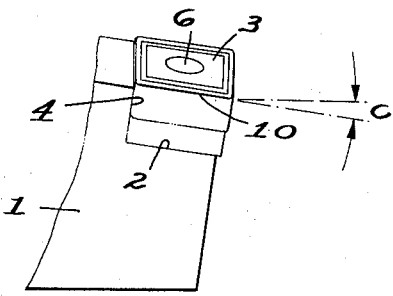
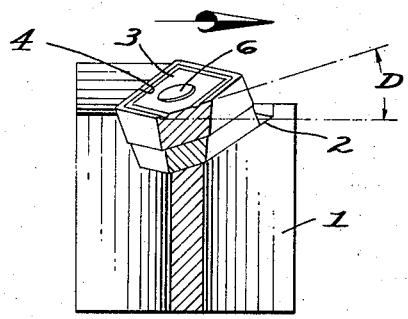
INVENTORS
ELBERT J. WELLER
HENRY M. SCHRIER
BY
Harold J Holt
ATTORNEY

United States Patent Office 3,249,985
Patented May 10, 1966

3,249,985
CUTTING TOOL
Elbert J. Weller, Detroit, and Henry M. Schrier, Centerline, Mich., assignors to General Electric Company, a corporation of New York
Filed Oct. 11, 1965, Ser. No. 494,824
3 Claims. (Cl. 29—96)

This invention relates to a cutting tool, and more specifically to a single-point cutting tool of the type containing a hard metal cutting tip ordinarily used in the machining of metals.

In the machining of high temperature alloys, the hard metal cutting tip, usually cemented carbide, is subjected to unusually severe cutting stresses. As a result, tool failure takes place by a pulling out of carbide particles in the interface area between cutting tip and chip. This failure is particularly severe at the depth of cut line. This is in contrast to normal tool failure which takes place by a gradual wearing of the carbide along the approach angle surface.

It is a principal object of the present invention to eliminate or substantially reduce the type of cutting tip failure which ordinarily occurs in the machining of high temperature alloys.

We have discovered that the use of compound rake angles comprising a very high negative back rake and a moderately high negative side rake angle markedly improves the metal removal process involved in the machining of high temperature alloys. Specifically, the use in combination of a negative back rake angle of from 16–25° and preferably 20°, coupled with a negative side rake angle of 5–9° and preferably 8°, significantly reduces cutting tool failure and also permits a sharp improvement in the metal removal rate in the machining of high temperature alloys.

The invention will be better understood from the following description taken in connection with the accompanying drawing in which FIGURE 1 is a plan view of a cutting tool useful in the practice of the present invention;

FIGURE 2 is an elevational view along the lines 2—2 of FIG. 1 of the head portion of the cutting tool of FIG. 1 showing the extreme negative back rake of the invention;

FIGURE 3 is an elevational view along the lines 3—3 of FIG. 1 of the head portion of the cutting tool of FIG. 1 showing the negative side rake; and FIGURE 4 is a view partially in section along the lines 4—4 of FIG. 1 showing the effective positive rake angle in the direction of feed during cutting.

A typical single-point cutting tool is illustrated in the drawing. While the cutting insert may be attached to the shank by any means, including clamping or brazing, a particularly suitable means is the pin-type of attachment illustrated in the drawing. In FIG. 1, a shank 1 having a recess 2 at an end portion thereof holds a square disposable insert 3 and seat 3' both of cemented tungsten carbide against a shoulder 4. The tool is shown in cutting position against a workpiece 5. As can be more clearly seen in FIG. 2, the insert is held in the recess 2 by means of a cam pin 6 which is anchored by a retaining ring 7 in shank 1 and which, upon rotation, forces the eccentric extension 8 against the insert which forces the insert against shoulder 4 and locks it in position.

The side cutting edge angle A, frequently called the lead or approach angle, is illustrated as 45° in FIG. 1, and this is a preferred value for this particular angle, although it can vary from 30–60°. The arrow in FIG. 1 (and in FIG. 4) shows the direction of feed in which the tool is intended to be used.

The rake angles of a cutting tool generally define the several angles at which the cutting bit contacts the workpiece being cut or machined, or more specifically, the angles between the top surface of a cutting bit and a plane parallel with the top surface of the shank. In accordance with accepted usage of the term, the back rake is the angle included between a line along the exposed cutting edge of the cutter bit in the direction of feed and a line parallel with the top surface of the shank of the tool. Similarly, the side rake is the angle included between a line along the exposed cutting edge away from the direction of feed and a line along the surface of the shank of the cutting tool.

These angles are shown in FIGS. 2 and 3 of the drawing. The back rake angle B is illustrated in FIG. 2 between a line along the leading cutting edge 9 of the insert and a line parallel to the top of the shank of the cutting tool. The side rake angle C, illustrated in FIG. 3, is between a line along the trailing cutting edge 10 and a line parallel to the top of the shank.

The use of a 16–25° negative back rake angle and a 5–9° negative side rake angle results in an effective positive rake angle in the direction of feed of the cutting tool. In case of a 20° negative back rake angle, and an 8° negative side rake angle, the effective positive rake cutting angle is 8°. This is illustrated in FIG. 4 which is a section through the nose of the cutting tool parallel to the workpiece. As there shown, there is a resultant angle D between a line along the top surface of insert 3 parallel to the direction of feed and a line parallel to the top of the shank 1 in the direction of feed. There is thus an effective 8° positive rake cutting angle even though a high negative back rake and negative side rake are used. Because of this resultant positive cutting angle, the carbide tip "shears" the metal during the cutting process as in positive rake cutting rather than "pushing" the metal as in negative rake cutting. Thus, when a high temperature alloy piece is turned on a lathe, the radial shearing action virtually eliminates pulling out of carbide particles in the chip-insert interface area. Tool wear along the cutting tip occurs as in the case of normal machining operations, and tool life is thus considerably increased. An additional benefit resides in the large relief angles resulting from the use of the extreme rake angles. This can best be seen in FIG. 2 where the relief angle E can be seen to be quite large, of the order of 20°. It is generally accepted that larger relief angles result in longer tool life.

High temperature alloys of the type with which the present invention is particularly useful are of the nickel and cobalt base type having appreciable amounts of chromium and frequently aluminum and titanium. They are widely used in jet engines and gas turbines as, for example, wheels, shafts, buckets or blades where the parts must have high strength and resistance to creep and oxidation at high operating temperatures.

What we claim as new and desire to secure by Letters Patent of the United States is:

1. A cutting tool having a shank and a hard metal cutting tip mounted at one end thereof, said cutting tool having a negative back rake angle of 16–25° and a negative side rake angle of 5–9°.

2. The cutting tool of claim 1 in which the negative back rake angle is approximately 20° and the negative side rake angle is approximately 8°.

3. A cutting tool having a shank and a disposable cutting tip mechanically held at one end thereof, said cutting tool having a negative back rake angle of 16–25°, a negative side rake angle of 5–9° and a side cutting edge angle of 30–60°.

No references cited.

WILLIAM W. DYER, Jr., *Primary Examiner.*

H. L. HINSON, *Assistant Examiner.*